(12) United States Patent
Fujimoto et al.

(10) Patent No.: US 8,320,765 B2
(45) Date of Patent: Nov. 27, 2012

(54) OPTICAL SIGNAL TRANSFER DEVICE

(75) Inventors: Masanori Fujimoto, Itabashi-ku (JP); Kunihiro Hayashi, Itabashi-ku (JP)

(73) Assignee: Kabushiki Kaisha Topcon, Tokyo (JP)

( * ) Notice: Subject to any disclaimer, the term of this patent is extended or adjusted under 35 U.S.C. 154(b) by 359 days.

(21) Appl. No.: 12/654,436

(22) Filed: Dec. 18, 2009

(65) Prior Publication Data
US 2010/0166433 A1  Jul. 1, 2010

(30) Foreign Application Priority Data
Dec. 25, 2008 (JP) ................... 2008-329362

(51) Int. Cl.
H04B 10/22 (2006.01)
H04B 10/12 (2006.01)

(52) U.S. Cl. ........................ 398/114; 398/141
(58) Field of Classification Search ............... 398/114, 398/141
See application file for complete search history.

(56) References Cited

U.S. PATENT DOCUMENTS
5,535,033 A * 7/1996 Guempelein et al. ......... 398/114
2009/0154936 A1* 6/2009 Schierling et al. ............ 398/141

FOREIGN PATENT DOCUMENTS
JP  2004-111696  4/2004
* cited by examiner

*Primary Examiner* — Leslie Pascal
(74) *Attorney, Agent, or Firm* — Wenderoth, Lind & Ponack, L.L.P.

(57) ABSTRACT

An optical signal transfer device includes a transmitter system and a receiver system for signal transfer between a base unit and a rotary unit. The receiver system includes a natural number n of light receiving portions forming a ring-like light receiving area around the rotary axis and a light reception controller. The transmitter system includes a light emitting portion, an emission controller, and an optical guide which guides a light beam from the light emitting portion to a light emitting area facing the light receiving area. The optical guide guides a light beam to the light emitting area in one of n equally divided areas of a ring-like opposing area which opposes the light receiving area. Therefore, one of the n light receiving portions always face the light emitting area irrespective of rotary position of the receiver system around the rotary axis relative to the transmitter system.

10 Claims, 12 Drawing Sheets

OPTICAL SIGNAL TRANSFER DEVICE

CROSS REFERENCE TO RELATED APPLICATION

The present application is based on and claims priority from Japanese Patent Application No. 2008-329362, filed on Dec. 25, 2008, the disclosure of which is hereby incorporated by reference in its entirety.

BACKGROUND OF THE INVENTION

1. Field of the Invention

The present invention relates to an optical signal transfer device which transfers signals between a receiver system and a transmitter system which are relatively rotated around a single axial line.

2. Description of the Related Art

In surveying work in association with civil engineering work, use of surveying equipment with a ranging unit rotatable on a base (support unit) is well known. In order to control a light adjuster in the ranging unit, the surveying equipment is required to be able to transfer a control signal from an arithmetic controller of the base unit to the light adjuster of the ranging unit in rotation, that is, to transfer signals between the base unit and the ranging unit as a rotary element. For this purpose, there is a slip ring having a contact slidably contacting with the rotary element to electrically connect an output terminal of the base unit and an input terminal of the ranging unit.

Generally, the surveying equipment is required to accurately transfer control signals from the arithmetic controller to the light adjuster while the ranging unit is in high-speed rotation. However, since the rotary element slides with the contact of the slip ring, problems arise in the slip ring such as abrasion and deterioration of the rotary element and the contact and a contact failure between the two due to their own vibration. Preferably, these problems should be solved from the standpoint of accurate, reliable signal transfer.

In order to solve such problems, Japanese Laid-open Patent Publication No. 2004-111696 for example discloses an optical slip ring which can perform signal transfer in a non-contact manner. Such a slip ring comprises optical transmitter systems and receiver systems on both a fixed member (equivalent to the base unit in the above example) and a rotary member (equivalent to the ranging unit in the above example) so that they face the rotary axis. Such a slip ring can transfer signals between the fixed member and the rotary member relatively rotated by receiving the optical signal from the transmitter system of the fixed member with the receiver system of the rotary member even with a change in a rotary position of the rotary member relative to the fixed member.

There is a surveying apparatus which includes a laser beam emitter in a ranging unit rotatably supported on a base unit to emit a laser beam in a direction orthogonal to the rotary axis. Such a surveying apparatus is configured to emit a laser beam to an object, receive a reflected light therefrom with a light receiver system, and measure an incidence angle of a light receiving position relative to a plane orthogonal to the rotary axis and a height from the emission position. In order to improve the measuring accuracy of the incidence angle and height, the surveying apparatus needs to reduce shifts of a laser beam from the rotary axis as much as possible. Because of this, in the surveying apparatus the ranging unit accommodates a mirror on the rotary axis and a laser light source is secured on a base unit to emit a laser light to the mirror along the rotary axis.

Such a surveying apparatus cannot adopt an optical slip ring for positioning optical receiver systems/transmitter systems on both of the fixed member (base unit) and rotary member (ranging unit) on the rotary axis since it includes the laser beam emitter in the space around the rotary axis of the base and the ranging unit.

SUMMARY OF THE INVENTION

The present invention aims to provide an optical signal transfer device which can transfer signals between a base unit and a rotary unit relatively rotating in a non-contact manner without using a certain space around the rotary axis.

According to one aspect of the present invention, an optical signal transfer device which transfers a signal between a base unit and a rotary unit rotatable around a rotary axis and supported on the base unit, is configured to include a transmitter system provided in one of the base unit and the rotary unit to transmit a signal, and a receiver system provided in the other of the base unit and the rotary unit to receive the signal from the transmitter system, wherein the receiver system comprises n light receiving portions which are rotated around the rotary axis relative to the transmitter system on a single plane orthogonal to the rotary axis by a relative rotation of the base unit and the rotary unit and form a single ring-like light receiving area, and a light reception controller which processes an electric signal output from each of the light receiving portions, the n being a natural number; the transmitter system comprises a light emitting portion, an emission controller which drives the light emitting portion in accordance with a transmit signal, and an optical guide which guides a light beam from the light emitting portion to a light emitting area provided in an area opposing the light receiving area; the opposing area is an area in a ring-like form around the rotary axis opposing the light receiving area and is equally divided into n areas in a circumferential direction; and the optical guide guides the light beam to at least one of the n divided areas as the light emitting area, so that at least one of the n light receiving portions is to face the light emitting area irrespective of a rotary position of each of the light receiving portions relative to the transmitter system.

In features of the above aspect, the optical guide includes an exit face which opposes the light receiving area and emits the light beam, and includes inside a scattering face which scatters the light beam in a direction to the exit face.

In other features of the above aspect, the scattering face is formed on a face opposing the exit face.

In other features of the above aspect, the exit face is formed to be such a lens face as to increase an amount of a light beam, among the light beam the exit face emits, to be incident on the light receiving portions of the receiver system.

BRIEF DESCRIPTION OF THE DRAWINGS

The present invention will be described below with reference to the following description of an exemplary embodiment and the accompanying drawings in which:

FIG. 8A shows total reflection of light on an interface and FIG. 8B shows scattering light on a scattering face;

DETAILED DESCRIPTION OF THE PREFERRED EMBODIMENTS

Figure 1:
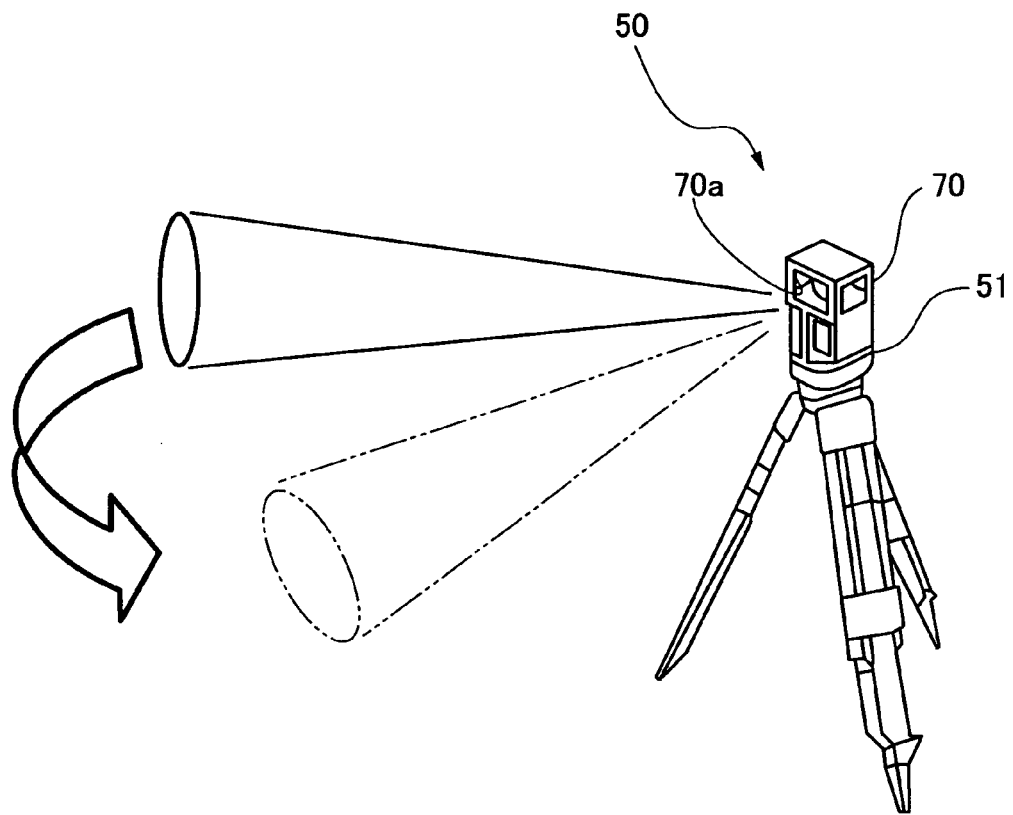
FIG. 1 is a perspective view of a three dimensional position measuring apparatus incorporating an optical signal transfer device according to the present invention.
Figure 2:
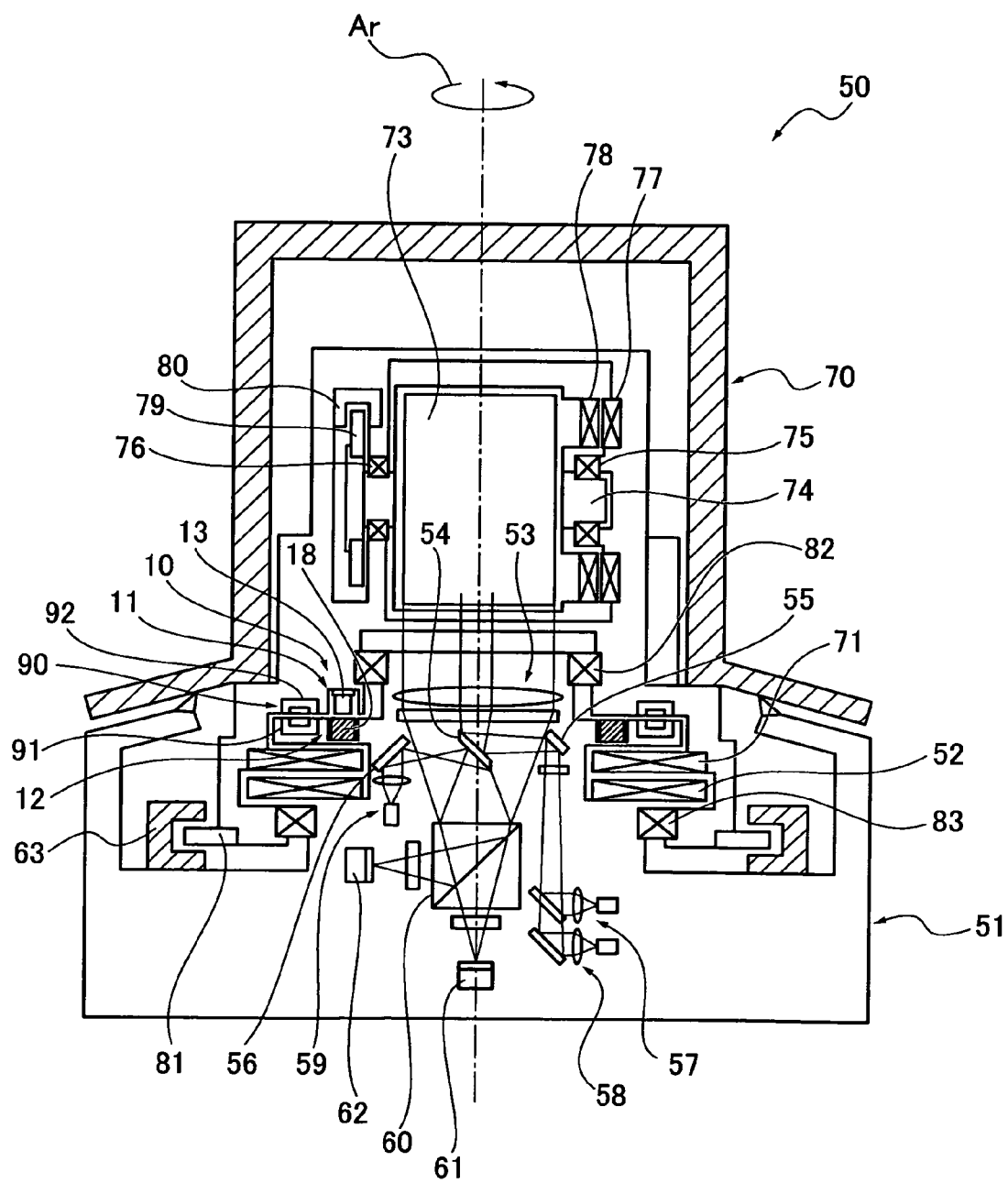
FIG. 2 is a vertical cross sectional view of the three dimensional position measuring apparatus including the optical signal transfer device according to the present invention.
Figure 3:
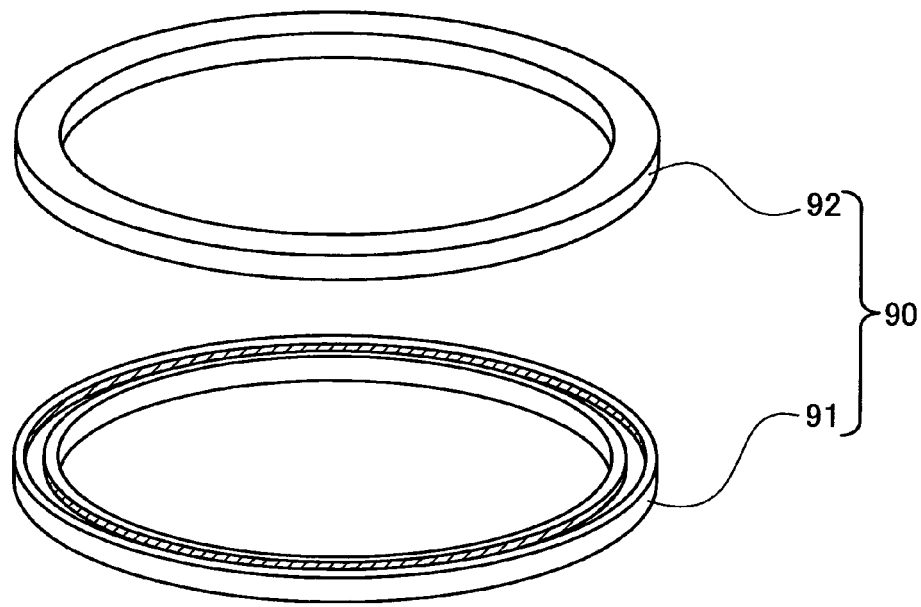
FIG. 3 is an exploded perspective view of an electric power transmitter system of the three dimensional position measuring apparatus.
Figure 4:
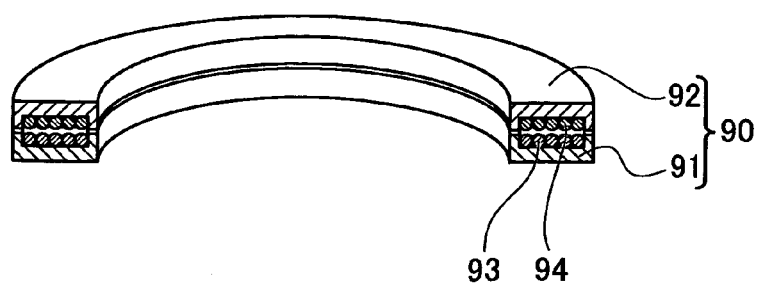
FIG. 4 is a perspective view of a vertical cross section of the electric power transmitter system.

Hereinafter, an optical signal transfer device 10 according to the present invention will be described in detail with reference to FIGS. 1 to 4. FIG. 1 is a perspective view of a three dimensional position measuring apparatus 50 incorporating the optical signal transfer device 10 according to the present invention. FIG. 2 is a vertical cross sectional view showing structures of the three dimensional position measuring apparatus 50 and optical signal transfer device 10. FIG. 3 is an exploded perspective view of an electric power transfer unit 90 of the three dimensional position measuring apparatus 50. FIG. 4 is a perspective view of a vertical cross section of the electric power transfer unit 90.

The three dimensional position measuring apparatus 50 comprises the optical signal transfer device 10 according to one embodiment of the present invention, a base unit 51, and a rotary optical unit 70 rotatable relative to the base unit 51. The rotary optical unit 70 is rotatable around a rotary axis Ar relative to the base unit and fixed on the base unit 51 via rotary bearings 82, 83. The three dimensional position measuring apparatus 50 is provided with the optical signal transfer device 10 to transfer a data signal between the base unit 51 and the rotary optical unit 70 as well as an electric power transfer unit 90 to supply electric power from the base unit 51 to the rotary optical unit 70, which will be described in detail later.

First, a rotary mechanism of the three dimensional position measuring apparatus 50 will be described.

A stator 52 composed of a plurality of coiled cores on a circumference around the rotary axis Ar is disposed in the base unit 51 while a rotor 71 having a plurality of permanent magnets on a circumference around the rotary axis Ar is disposed in a part of the rotary optical unit 70 facing the stator 52. The stator 52 and the rotor 71 are both direct drive (DD) motors using the principle of a DC brushless motor. In the three dimensional position measuring apparatus 50, the rotary optical unit 70 is rotated relative to the base unit 51 by rotary force of the rotor 71 to the stator 52 which occurs from energizing the coils of the stator 52 with a not-shown control circuit.

Next, a measuring mechanism of the base unit 51 will be described. The base unit 51 includes a main lens system 53 which is comprised of a plurality of lenses combined to exert a predetermined optical characteristic. The main lens system 53 is disposed so that the optical axis thereof coincides with the rotary axis Ar, and a first sub reflective mirror 54 with reflective faces on both sides is provided behind the main lens system 53 (downward in the drawing). A second sub reflective mirror 55 is disposed on the right side of the first sub reflective mirror 54 while a third sub reflective mirror 56 is disposed on the left side thereof in FIG. 2.

Below the second sub reflective mirror 55 disposed are a tracking light emitting portion 57 and a measuring light emitting portion 58. The tracking light emitting portion 57 emits light for tracking a so-called corner cube reflector (not shown), and the measuring light emitting portion 58 emits light irradiating the corner cube reflector to measure a distance. The tracking light emitting portion 57 includes a half mirror to guide the tracking light and measuring light to the second sub reflective mirror 55 with their optical axes coincident with each other. The tracking and measuring lights are set to have different wavelengths.

A measuring light receiving portion 59 is disposed below the third sub reflective mirror 56 to receive the measuring light. A selective reflective mirror 60 is disposed below the first sub reflective mirror 54 to reflect the measuring light upward to the first sub reflective mirror 54, reflect the tracking light leftward in the drawing (to a later described tracking light CCD 62), and transmit other lights (in wavelengths different from those of the tracking and measuring lights) downward (to a later described imaging CCD 61). Below the selective reflective mirror 60, an imaging CCD 61 is disposed to capture an image on a later-described rotary reflective mirror 73, and on the left side thereof, a tracking light CCD 62 is disposed to detect the tracking light.

Further, the base unit 51 comprises an optical detector 63 which detects an orientation of the rotary optical unit 70 (horizontal angle, angle of orientation). The rotary optical unit 70 comprises a slit disc 81 in association with the optical detector 63. The slit disc 81 has slits in a circumferential direction to detect an orientation of the rotary optical unit 70. The optical detector 63 with a vertical cross section of a U-shape is disposed to place the slit disc 81 in the U-shaped portion. It is configured to have a not-shown light-emitting diode in one of the U-shaped portion and a not-shown phototransistor on the other of the U-shaped portion so as to detect a pulse light from the slits of the slit disc 81 passing the front of the light-emitting diode with the phototransistor and output a signal indicating angle information. The slit disc 81 and the optical detector 63 constitute an angle detector such as a general rotary encoder.

The base unit 51 further comprises a controller 22 (FIG. 5) and a not-shown power source. The controller 22 includes a CPU, a memory, and various interface circuits to perform operation control and distance calculation (later described). The memory (not shown) of the controller stores various kinds of measured data and image data. The controller 22 functions to transfer control signals to a rotary unit controller 16 (FIG. 5) contained in the rotary optical unit 70 via the optical signal transfer device 10 according to the present invention.

Next, structure of the rotary optical unit 70 as a rotary unit rotatably supported on the base unit 51 will be described.

The rotary optical unit 70 has a rotary reflective mirror 73 disposed to rotate around the rotary axis Ar along with rotation of the rotary optical unit 70 relative to the base unit 51. That is, the center of a mirror face of the reflective mirror 73 is on the rotary axis Ar. The rotary reflective mirror 73 is supported by a rotary shaft 74 in such a state that it can change an angle in a vertical direction. The rotary shaft 74 is supported by rotary bearings 75, 76 in the rotary optical unit 70. As shown in FIG. 1, the rotary optical unit 70 comprises an opening 70a so that the rotary reflective mirror 73 can let in/emit light from/to outside through the opening 70a. Owing to the rotary reflective mirror 73 configured to be rotatable around the rotary shaft 74, the three dimensional position measuring apparatus 50 is able to deflect emitting light in a vertical direction. Note that herein, a rotation angle of the rotary reflective mirror 73 around the rotary shaft 74 in a vertical direction is defined to be a vertical deflection angle.

For controlling light deflection of the rotary reflective mirror 73, the rotary optical unit 70 includes a stator 77 which is composed of a plurality of coiled cores on a circumference around the rotary axis A. A rotor 78 having a plurality of permanent magnets on a circumference around the rotary axis Ar is disposed in a portion of the rotary reflective mirror 73 facing the stator 77. The stator 77 and the rotor 78 constitute a direct drive (DD) motor using the principle of a DC brushless motor. In the rotary optical unit 70 (three dimensional position measuring apparatus 50), the vertical deflection angle of the rotary reflective mirror 73 around the rotary shaft 74 can be controlled by rotary force of the rotor 78 to the stator 77 which occurs from energizing the coils of the stator 77 with a rotary unit controller 16 (FIG. 5) in the rotary optical unit 70.

A slit disc 79 having slits in a circumferential direction is attached on one end of the rotary shaft 74 in order to detect the vertical deflection angle of the rotary reflective mirror 73. The rotary optical unit 70 includes an optical detector 80 in association with the slit disc 79. The optical detector 80 with a vertical cross section of a U-shape is disposed to place the slit disc 79 in the U-shaped portion. It is configured to have a not-shown light-emitting diode in one of the U-shaped portion and a not-shown phototransistor on the other of the U-shaped portion so as to detect a pulse light from the slits of the slit disc 79 passing the front of the light-emitting diode with the phototransistor and output a signal indicating angle information. The slit disc 79 and the optical detector 80 constitute an angle detector such as a general rotary encoder.

As described above, the electric power transfer unit 90 supplies power from the base unit 51 to the rotary optical unit 70 in the three dimensional position measuring apparatus 50. The electric power transfer unit 90 will be described next.

The electric power transfer unit 90 comprises an electric power transmitter 91 in the base unit 51 and an electric power receiver 92 in the rotary optical unit 70 both of which are made of a magnetic member (ferrite) and have a ring-like shape with a concave cross section, as shown in FIGS. 2, 3.

As shown in FIG. 4, a coil 93 is contained inside of the concave cross section of the electric power transmitter 91 while a coil 94 is contained inside of that of the electric power receiver 92. Openings of their respective concave cross sections face each other with a predetermined interval (several dozen μm to several hundred μm).

With such a configuration, a high frequency current flowing into the coil of one of the electric power transmitter 91 and the electric power receiver 92 can also flow into that of the other due to mutual induction. Using this principle, the electric power transfer unit 90 transfers electric power in a non-contact manner. This electric power transfer unit 90 can suppress a transfer loss since a closed magnetic path is formed through the inside of the electric power transmitter 91 and electric power receiver 92 composed of magnetic members when mutual induction occurs.

As described above, the optical signal transfer device 10 transfers data signals between the base unit 51 and the rotary optical unit 70 in the three dimensional position measuring apparatus 50, which will be described in detail later. Herein, the optical signal transfer device functions to transfer a control signal for controlling the vertical deflection angle of the rotary reflective mirror 73 from the controller 22 (FIG. 5) of the base unit 51 to the rotary unit controller 16 (FIG. 5) of the rotary optical unit 70.

Next, one example of operation of the three dimensional position measuring apparatus 50 will be described. The following operation is executed by the controller 22 incorporated in the base unit 51.

At a start of three dimensional position measuring, the three dimensional position measuring apparatus 50 first searches for a not-shown corner cube reflector provided near a target object. In this operation, the tracking light from the tracking light emitting portion 57 is reflected by the second sub reflective mirror 55 and the first sub reflective mirror 54 to the main lens system 53 as shown in FIG. 2. Transmitting through the main lens system 53, the tracking light travels to the rotary optical unit 70 from the base unit 51, and is reflected by the rotary reflective mirror 73 on the rotary axis Ar to outside of the apparatus via the opening 70a of the rotary optical unit 70.

Then, a control current is flowed into the stator 52 to rotate the rotary optical unit 70 relative to the base unit 51. At the same time, the optical signal transfer device 10 transfer data on the vertical deflection angle of the rotary reflective mirror 73 from the controller 22 of the base unit 51 to the rotary unit controller 16 of the rotary optical unit 70. The rotary unit controller 16 controls the vertical deflection angle of the rotary reflective mirror 73 (control over deflection of the tracking light) based on the data.

Figure 5:
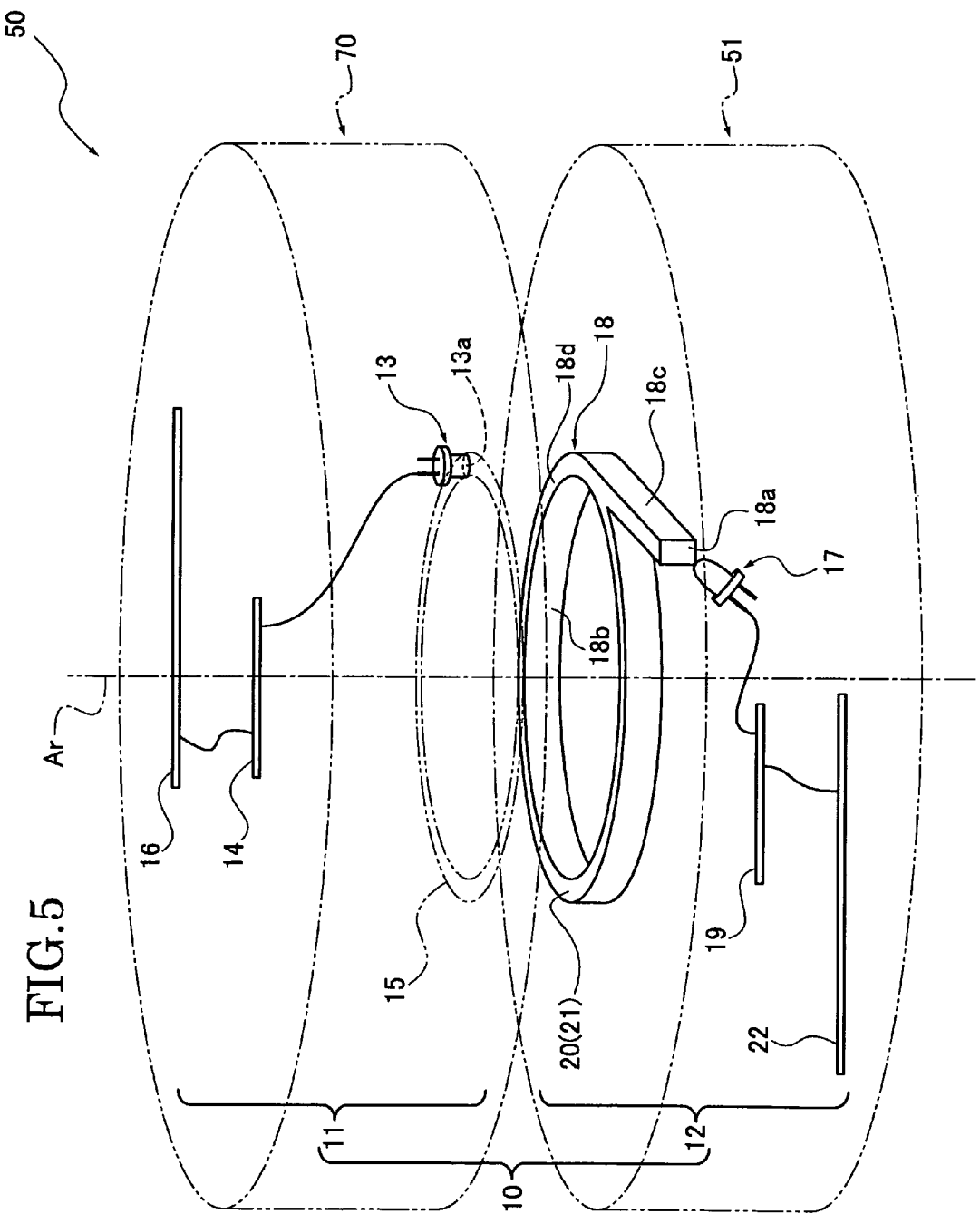
FIG. 5 is a perspective view of the optical signal transfer device according to a first embodiment of the present invention.

Thus, the tracking light reflected by the corner cube reflector is searched by changing the horizontal angle of the rotary optical unit 70 and the vertical deflection angle of the rotary reflective mirror 73. The reflected light by the corner cube reflector incident on the rotary reflective mirror 73 is retrieved into the base unit 51 via the main lens system 53. Thereafter, the reflected light is reflected by the selective reflective mirror 60 to the left side of FIG. 2 and detected by the tracking light CCD 62. An image captured on the CCD 62 is processed by a not-shown image processor of the controller 22 (FIG. 5). Then, the controller 22 adjusts the level of the control current supplied to the stator 52 for adjusting the horizontal angle of the rotary optical unit 70 and the stator 77 for adjusting the vertical deflection angle of the rotary reflective mirror 73 so as to position the corner cube reflector at the center of the captured image.

When the corner cube reflector comes at the center of the captured image by the tracking light CCD 62, emission of the tracking light is stopped and the measuring light is emitted from the measuring light emitting portion 58. The measuring light is reflected by the second sub reflective mirror 55 and the first sub reflective mirror 54, and passes through the main lens system 53 to be reflected by the rotary reflective mirror 73 to outside of the apparatus via the opening 70a of the rotary optical unit 70 and irradiate the above corner cube reflector.

Then, reflected by the corner cube reflector, the measuring light is incident on and reflected by the rotary reflective mirror 73 to be retrieved into the base unit 51 via the main lens system 53. Further, the measuring light is reflected upward by the selective reflective mirror 60 and reflected in a left direction by the first sub reflective mirror 54. The reflected measuring light is reflected downward by the third sub reflective mirror 56 and received by the measuring light receiving portion 59.

The controller 22 controls the measuring light emitting portion 58 to repetitively emit the measuring light in pulse form with a predetermined time interval. The controller 22 calculates a distance between the three dimensional position measuring apparatus 50 and the corner cube reflector based on the light emission timing and the reception timing of the measuring light receiving portion 59.

As described above, the three dimensional position measuring apparatus 50 can measure a distance between the apparatus 50 and the corner cube reflector at an arbitrary position. For measuring the distance, the apparatus 50 captures an image having the corner cube reflector at the center with the imaging CCD 61 to acquire image information on a target measuring position. The acquired image data is stored in the memory (not shown) of the controller 22 of the base unit 51.

The three dimensional position measuring apparatus 50 can three-dimensionally measure positions of a plurality of corner cube reflectors by repetitively measuring distances thereto.

For this operation, the rotary optical unit 70 is appropriately rotated relative to the base unit 51 and the vertical deflection angle of the rotary reflective mirror 73 is properly controlled while the optical signal transfer device and the electric power transfer unit 90 perform data transfer and power transfer in non-contact manner. This will prevent a problem such as a wear-out of an electrode due to sliding so that the apparatus 50 can realize high durability and high reliability as well as reduce costs for maintenance or components.

First Embodiment

Next, the structure of the optical signal transfer device 10 will be described with reference to FIG. 5.

The optical signal transfer device 10 comprises a receiver system 11 and a transmitter system 12. The receiver system 11 is configured in a ring-like form to surround a system provided around the rotary axis Ar to emit the measuring light and tracking light in the rotary optical unit 70. The transmitter system 12 is configured in a ring-like form to surround the rotary reflective mirror 73 provided around the rotary axis Ar in the base unit 51.

In the optical signal transfer device 10 according to the first embodiment, the transmitter system 12 is provided at the top end of the base unit 51 while the receiver system 11 is provided at the bottom end of the rotary optical unit 70 to oppose the transmitter system 12. This makes it possible to provide the system for emitting the measuring light and tracking light and rotate the receiver system 11 around the rotary axis Ar relative to the transmitter system 12.

As shown in FIG. 5, the receiver system 11 includes a light receiving portion 13 and a receiver PCB (print circuit board) 14. The light receiving portion 13 is comprised of a photodiode as light receiving element to receive light on a light receiving face 13a and output an electric signal in accordance with intensity of the received light. The light receiving portion 13 is disposed so that the light receiving face 13a faces the transmitter system 12 (exit face 18d of a later described optical guide 18) and the optical axis of the light receiving face 13a coincides with the light emission direction (to rotary axis Ar in the present embodiment) of the transmitter system 12. Along with rotation of the rotary optical unit 70 around the rotary axis Ar relative to the base unit 51, the light receiving portion 13 is rotated around the rotary axis Ar relative to the transmitter system 12. Accordingly, the light receiving face 13a forms a ring-like trajectory (area indicated by numeric code 15) around the rotary axis Ar.

That is, in the receiver system 11, the light receiving face 13a of the light receiving portion is always present at one place on the ring-like trajectory 15 even during the rotation of the rotary optical unit 70 around the rotary axis Ar. Therefore, the light receiving portion can receive light irradiating the entire area of the trajectory without failure. In the light receiving portion 13 (receiver system 11), the ring-like trajectory is a light receiving area 15 which receives a light beam (optical signal) from the transmitter system 12 (later described).

Upon receiving the control signal from the controller 22 of the base unit 51, the transmitter system 12 emits a light beam (optical signal) to the light receiving portion 13 which is electrically connected with the receiver PCB 14. The receiver PCB 14 is electrically connected with the rotary unit controller 16 of the rotary optical unit 70. Upon receiving an electric signal from the light receiving portion 13, the receiver PCB 14 demodulates the electric signal into the original signal as the control signal output from the controller 22 and output it to the rotary unit controller 16. Thus, in the receiver system 11, the receiver PCB 14 functions as a light reception controller to process an electric signal from the light receiving portion 13 to be the same signal as that from the transmitter system 12.

The transmitter system 12 comprises a light emitting portion 17, an optical guide 18, and a transceiver PCB 19. The light emitting portion 17 is comprised of an LED as a light emitting element to emit a light beam along the exit optical axis, and is electrically connected with the transceiver PCB 19. The light emitting portion 17 is disposed to face an incidence face end 18a of the optical guide 18 so that the exit optical axis thereof is orthogonal to the incidence face end 18a.

The optical guide 18 functions to guide a light beam from the light emitting portion 17 to a ring-like opposing area 20 around the rotary axis Ar to emit the light beam to the light receiving area 15. The opposing area 20 is an area opposing the light receiving area 15. Thus, the light receiving portion 13 of the receiver system 11 can efficiently receive a light beam emitted from the opposing area 20 to the light receiving area 15.

According to the present embodiment, the optical guide 18 is made by bending a columnar acrylic member in a ring form and includes a ring-like main portion 18b and an incidence path 18c extending from a part of the portion 18b to a tangent line direction. An end of the incidence path 18c forms a plain face orthogonal to the extending direction as an incidence face end 18a. Further, all the surfaces of the optical guide 18 are formed to be extremely smooth with a high precision (mirror finish). Because of this, the optical guide 18 can efficiently guide a light beam emitted from the light emitting portion 17 and incident on the incidence face end 18a to inside of the main portion 18b through the incidence path 18c.

The optical guide is provided at the top end of the base unit 51 so that the top face (18d) of the ring-like main portion 18b is to be the opposing area 20. Also, the optical guide 18 is configured to emit light from the top face (18d) of the main portion 18b in as large amount as possible, and the top face is the exit face 18d. For example, the exit face 18d can be formed as a Fresnel lens to emit to the receiver system 11 (light receiving area 15) a light beam which travels inside the main portion 18b in the extending direction, or be processed to be able to scatter the light beam (not shown). Alternatively, inner face of the main portion 18b can be processed to generate a light beam to be incident on the exit face 18d at a smaller incidence angle than an optimal angle (not shown).

Accordingly, the optical guide 18 guides a light beam from the light emitting portion 17 and incident on the incidence face end 18a to the main portion 18b through the incidence path 18c. The guided light beam is emitted from the exit face 18d, the entire top face of the main portion 18b to the light receiving area 15 of the receiver system 11. In the present embodiment, the exit face 18d, the top face of the main portion 18b forms a light emitting area 21 to emit a light beam (optical signal) to the light receiving area 15 of the receiver system 11. Accordingly, the light emitting area 21 coincides with the opposing area 20. Further, the light receiving face 13a of the light receiving portion 13 is always present in any one position of the light receiving area 15 and the light emitting area 21 emitting a light beam is the opposing area 20 facing the light receiving area 15. With such a configuration, the optical signal transfer device 10 according to the present embodiment can transfer signals reliably.

The light emitting portion 17 emits a light beam to be guided to the optical guide 18 and is connected with the transceiver PCB 19 and driven thereby. The transceiver PCB 19 is electrically connected with the controller 22 of the base unit 51 which controls the emission of the light emitting portion 17 by transmitting a control signal to the rotary unit controller 16 of the rotary optical unit 70. Thus, the transceiver PCB 19 functions as an emission controller in the transmitter system 12.

Thereby, the transmitter system 12 can emit an optical signal corresponding to the control signal transmitted from the controller 22 from the exit face 18d (light emitting area 21) of the optical guide 18 to the light receiving area 15 of the receiver system 11. In other words, the light receiving portion 13 of the receiver system 11 is disposed to form the light receiving area 15 at a position opposing the exit face 18d of the optical guide 18 of the transmitter system 12.

Thus, according to the optical signal transfer device 10 of the present invention, the light emitting area 21 is formed at a position opposing at least one (one in the present embodiment) of the light receiving faces 13a of the light receiving portion 13 on the opposing area 20 which opposes the light receiving area 15 formed by the receiver system 11 along with the rotation of the rotary optical unit 70 around the rotary axis Ar. This makes it possible to reliably transfer desirable signals (data) from the transmitter system 12 to the receiver system 11 irrespective of rotation or non-rotation of the rotary optical unit 70 around the rotary axis Ar relative to the base unit 51.

Moreover, this optical signal transfer device 10 is configured to transfer signals by emitting a light beam from the transmitter system 12 and receiving it by the receiver system 11, and does not need to perform signal transfer in contact manner. Because of this, it is free from problems as a wear-out of an electrode due to sliding contact and can realize high durability and high reliability as well as reduce costs for maintenance or components.

Second Embodiment

Next, an optical signal transfer device according to a second embodiment of the present invention will be described.

Figure 6:
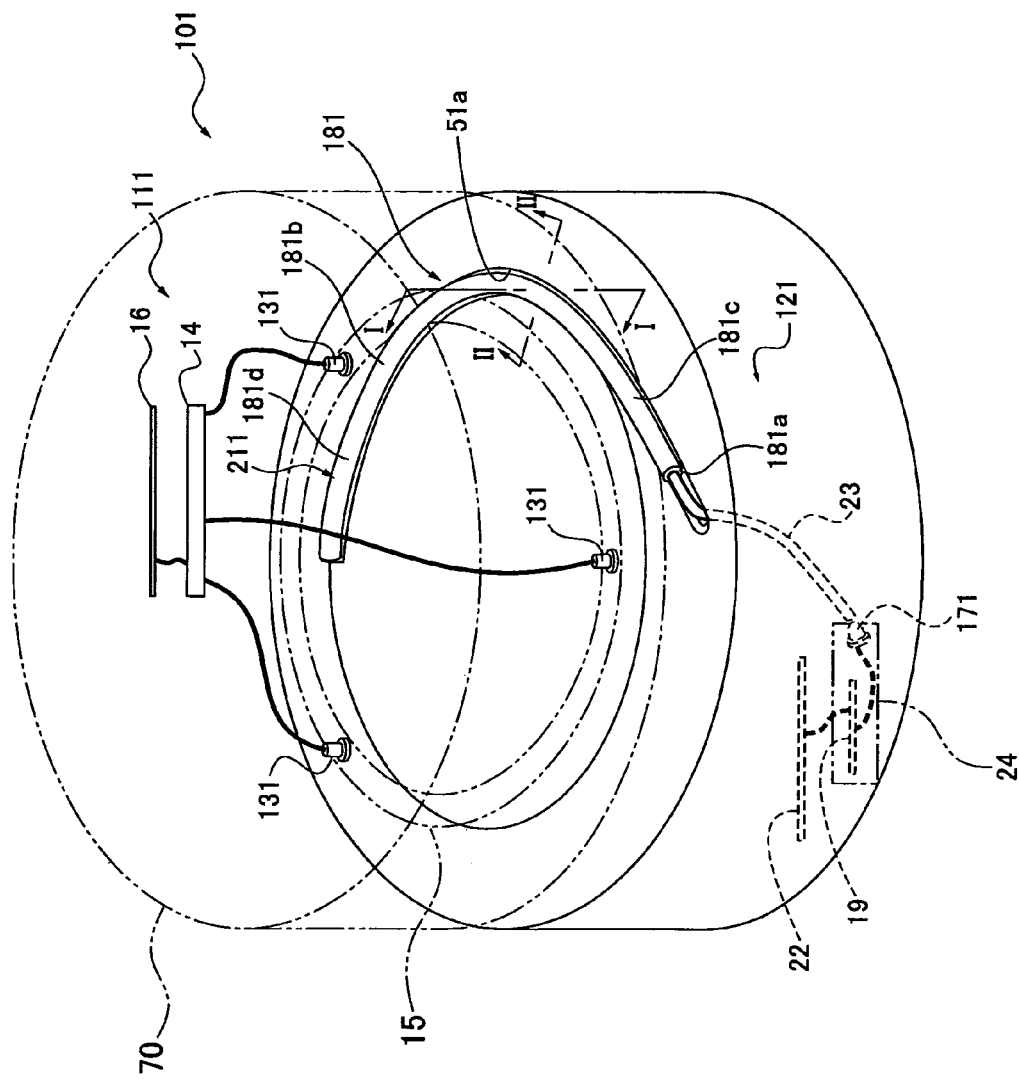
FIG. 6 is a perspective view of the optical signal transfer device according to the second embodiment.
Figure 7:
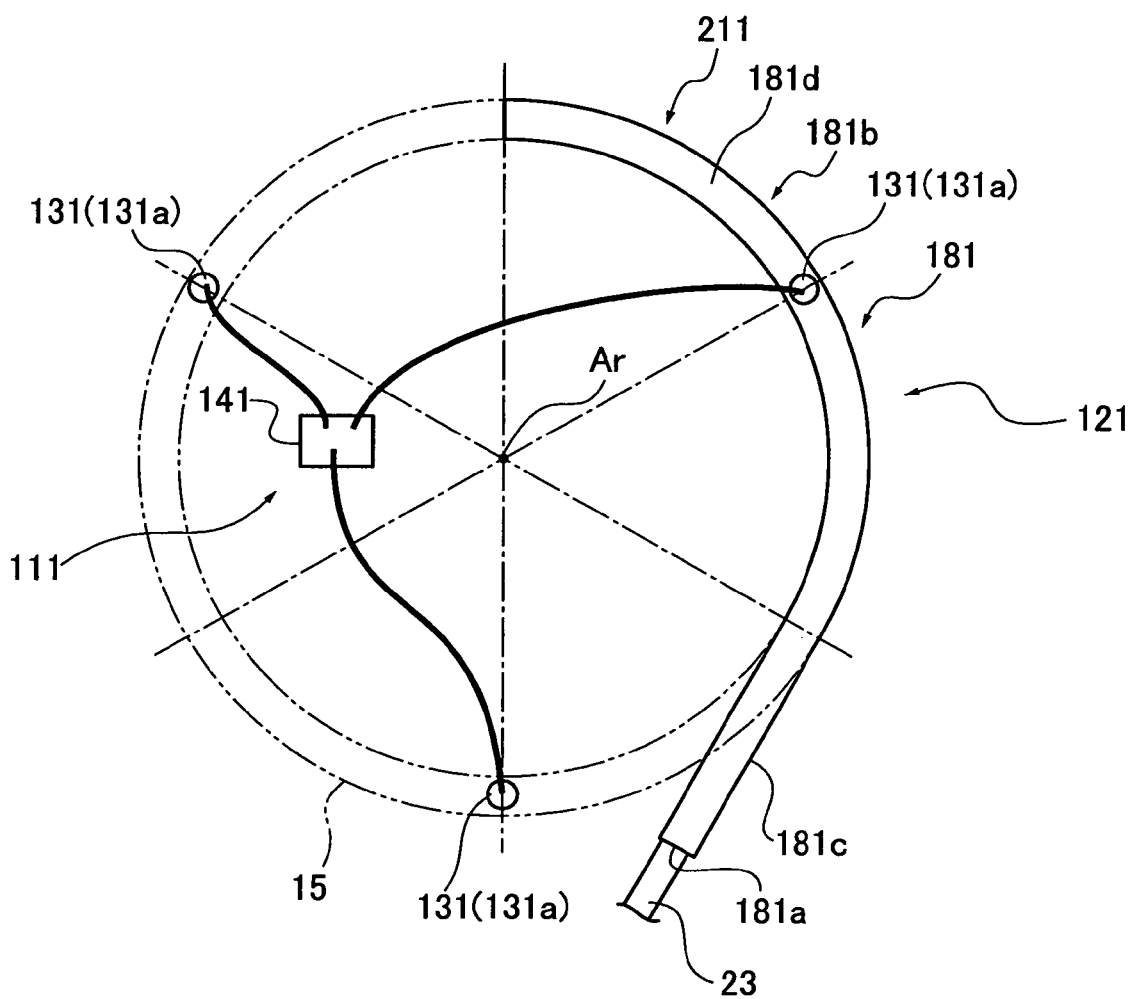
FIG. 7 illustrates the optical signal transfer device according to the second embodiment.
Figure 8A:
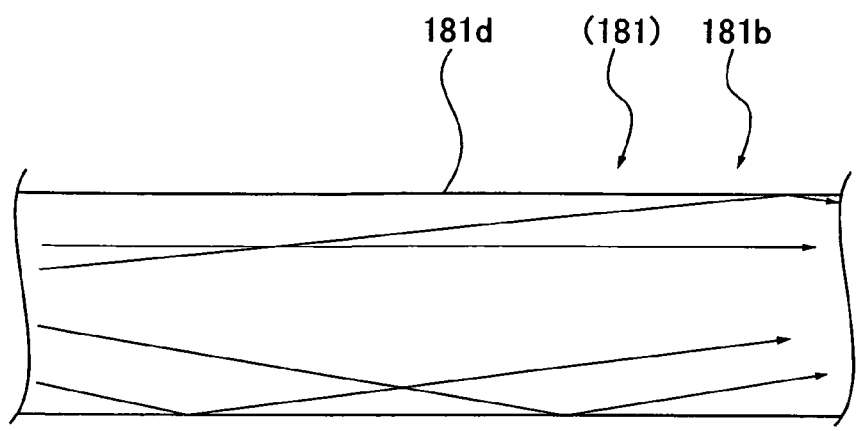
FIGS. 8A, 8B are cross sectional views of the optical signal transfer device along the I to I line of FIG. 6.
Figure 8B:
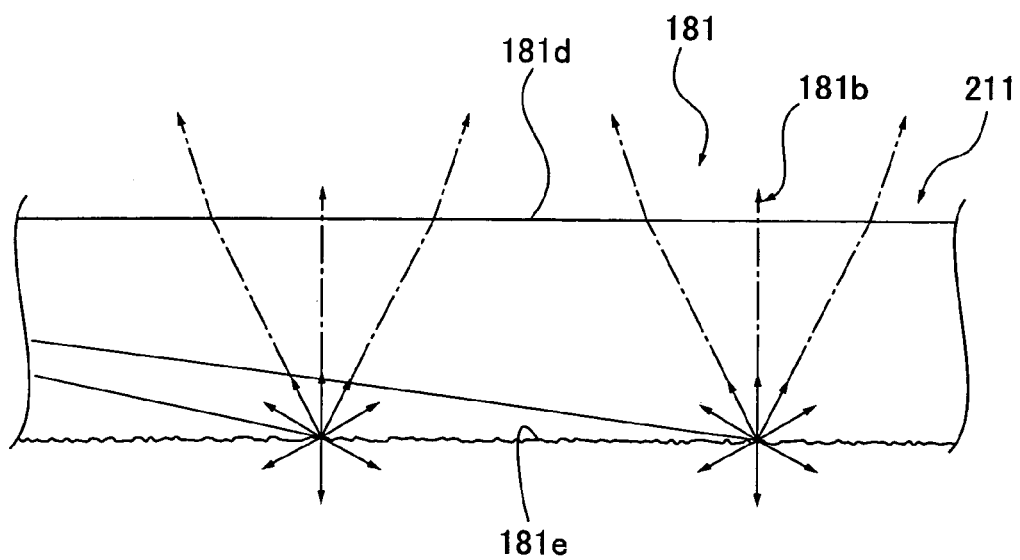
Figure 9:
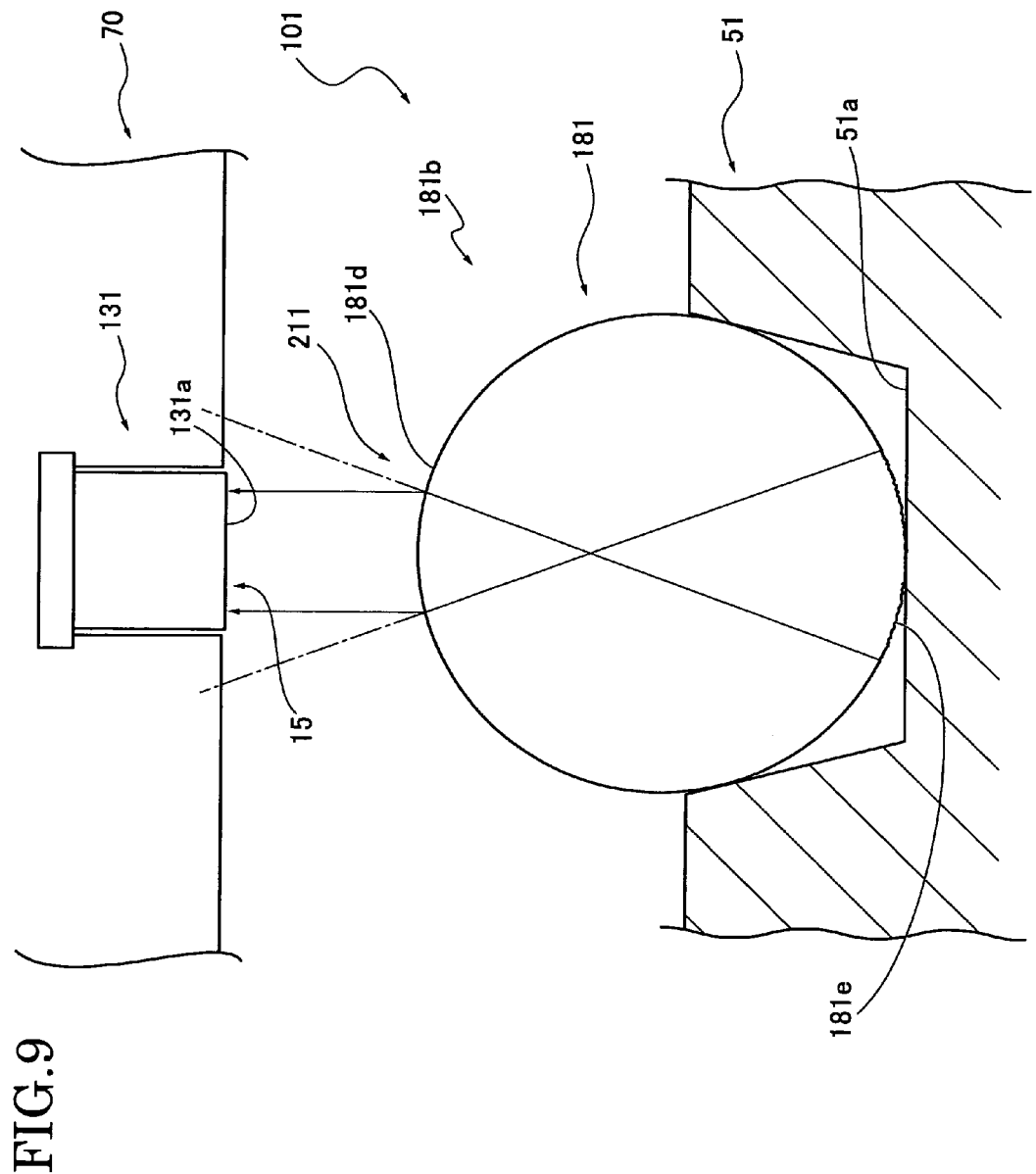
FIG. 9 is a cross sectional view of the optical signal transfer device along the II to II line of FIG. 6.

FIG. 6 is a perspective view of an optical signal transfer device 101 according to the second embodiment. FIG. 7 shows a relation between positions of an optical guide 181 of a transmitter system 121 and a light receiving portion 131 of a receiver system 111. FIGS. 8A, 8B are cross sectional views of the optical signal transfer device 101 along the I to I line of FIG. 6, and FIG. 8A shows total reflection of light on an interface (boundary face between the optical guide 181 and outside, hereinafter, interface) and FIG. 8B shows scattering light on a scattering face 181e. FIG. 9 is a cross sectional view of the optical signal transfer device 101 along the II to II line of FIG. 6.

The optical signal transfer device 101 according to the second embodiment is incorporated in the three dimensional position measuring apparatus 50 as the optical signal transfer device 10. The basic structure thereof is the same as that of the optical signal transfer device 10 so that the same components are given the same numeric codes and a detailed description thereof will be omitted.

In the optical signal transfer device 101, a light emitting area 211 of the transmitter system 121 is formed on an area which is one of three equally, circumferentially divided areas of the ring-like opposing area 20, as shown in FIGS. 6, 7.

The receiver system 111 of this optical signal transfer device 101 comprises three light receiving portions 131 which are all electrically connected with a receiver PCB 141. The receiver PCB 141 receives electric signals from all the light receiving portions 131 and demodulates the signals to control signals of the controller 22 of the base unit 51 to output them to the rotary unit controller 16. That is, the receiver system 111 (optical signal transfer device 101) is configured to receive an optical signal from the transmitter system 121 or a light beam from a later-described light emitting portion 171 at the three light receiving portions 131.

The three light receiving portions 131 are provided in the rotary optical unit 70 with equal interval from each other on the same circumference at the same distance from the rotary axis Ar to form a single light receiving area 15 as shown in FIG. 7. Specifically, the three light receiving portions 131 are disposed adjacent to one another around the rotary axis Ar with an interval of 120 degrees. Along with rotation of the rotary optical unit 70 around the rotary axis Ar relative to the base unit 51, the light receiving faces 131a adjacent to each other are moved on the single light receiving area 15. Therefore, in the optical signal transfer device 101, the light emitting area 211 can be formed only on one of the three equally divided areas of the opposing area 20 opposing the light receiving area 15. Thereby, the light emitting area 211 can always face any one of the three light receiving faces 131a irrespective of the rotation of the rotary optical unit 70 relative to the base unit 51.

The optical guide 181 of the transmitter system 121 is made of an acrylic member with a cylindrical cross section. The optical guide 181 includes a main portion 181b bent along a one-third of the opposing area 20 to be the light emitting area 211, and an incidence path 181c extending outward from the opposing area 20. An end of the incidence path 181c is an incidence face end 181a. The optical guide 181 is mounted in a groove 51a of the top end of the base unit 51. In the second embodiment the surface of the groove 51a is processed to be a reflective face (not shown).

The optical guide is made of a cylindrical acrylic member formed by drawing process and has an extremely smooth surface (as a mirror finish) in the circumferential direction.

As shown in FIGS. 8A, 8B and FIG. 9, a face of the optical guide 181 opposing the light receiving area 15 (three light receiving portions) of the receiver system 111 is an exit face 181d. A scattering face 181e is also formed on an opposite surface (in contact with the bottom face of the groove 51a) to the exit face 181d, to scatter a light beam in the optical guide 181e. It can be easily formed by rough processing as filing or blast process on the surface of the optical guide 181.

In the transmitter system 121 an optical fiber 23 is provided between the light emitting portion 171 and the incidence face end 181a of the optical guide 181 as in FIG. 6. That is, one end of the optical fiber 23 faces the light emitting portion 17 and the other end of the optical fiber 23 faces the incidence face end 181a of the optical guide 181. A light beam is emitted from the light emitting portion 171 to entirely travel along the exit optical axis and be incident on the incidence face end 181 of the optical guide 181 via the optical fiber 23. As shown in FIG. 8A, in the optical guide 181 the light beam travels in parallel to or at a small incidence angle relative to the extension direction. Since the optical guide 181 has an extremely smooth surface as mentioned above, the light beam guided into the optical guide 181 is totally reflected on its interface, and travels in the extension direction without a leak to the outside.

Further, owing to having the scattering face 181e, the optical guide 181 can emit a light beam toward the receiver system 111 (particularly, light receiving area 15) from the exit face 181d. As described above, the optical guide 181 guides the light beam in the extension direction by total reflection without a leak to the outside (FIG. 8A). In the optical guide 181 the guided light beam reaches the interface and a part of the light beam is scattered by the scattering face 181e as in FIG. 8B. Thus, the scattered light beam reaches the interface of the exit face 181d opposing the scattering face 181e at a larger incidence angle than the optimal angle and emitted therefrom to outside of the optical guide 181 (FIG. 9). Here, the exit face 181d is set to oppose the scattering face 181e since the scattered light beam is more likely to be incident on the interface at a larger incidence angle than the optimal angle and emitted therefrom as the exit face is further from the scattering face 181e. In such a manner the optical guide 181 can emit a light beam from the exit face 181d to the receiver system 111 (especially, light receiving area). In the transmitter system 121 one-third of the opposing area 20 functions as the light emitting area 211.

In the optical signal transfer device 101, an optical signal is emitted from the light emitting area 211 which is one third of the opposing area 20 of the transmitter system 121 in FIG. 7. The optical signal transfer device 101 is configured that any one of the three light receiving faces 131a is to always face the light emitting area 211. Accordingly, it is possible for one of the light receiving portions 131 to reliably receive optical signals from the light emitting area 211 of the transmitter system 121 irrespective of the rotation of the rotary optical unit 70 around the rotary axis Ar relative to the base unit 51.

The optical signal transfer device 101 can attain the following effects (1) to (10).

(1) The transmitter system 121 can reliably transfer desirable signals (data) to the receiver system 111 irrespective of the rotation of the rotary optical unit 70 around the rotary axis Ar.

(2) A light beam (optical signal) from the transmitter system 121 is received by the receiver system 111 to realize signal transfer in non-contact manner. This makes it possible for the device 101 to realize high durability and high reliability as well as to reduce costs for maintenance or components.

(3) The device 101 is configured that the transmitter system 121 emits a light beam from the light emitting area 211 of the opposing area 20 to the ring-like light receiving area 15 formed around the rotary axis Ar by the receiver system 111. Accordingly, it is possible to transfer signals (data) without using a certain space around the rotary axis Ar.

(4) The light emitting area 211 of the transmitter system 121 is formed only on one of the three circumferentially divided areas of the opposing area 20. Because of this, the device 101 can improve transfer efficiency without a cost increase, compared to the optical signal transfer device 10 (FIG. 5). In the optical signal transfer device 10 the transmitter system 12 is configured to include the optical guide 18 with the entire top face of the ring-like main portion 18b as the exit face 18d, while the receiver system 11 is configured to receive an optical signal from the transmitter system 12 at the single light receiving portion 13 (light receiving face 13a). Therefore, the receiver system 11 can receive the optical signal from the transmitter system only at the position where the light receiving portion 13 is present according to the rotation of the rotary optical unit 70 around the rotary axis Ar relative to the base unit 51. The transmitter system 12 emits the same optical signal to the entire light receiving area 15 so as to be able to transfer the optical signal irrespective of the location of the single light receiving portion 13 on the light receiving area 15. For this reason, the exit face 18d needs to be the entire top face of the main portion 18b of the optical guide 18.

Meanwhile, inside the optical guide 18 of the transmitter system 12, the intensity of the light beam is attenuated as it travels from the incidence face end 18a to the main portion 18b via the incidence path 18c. Accordingly, the light beam is emitted from the exit face 18d in different intensity depending on the circumferential position of the main portion 18b from which it is emitted. In other words, the further the emission position of the light beam on the exit face 18d from the incidence path 18c is, the lower the intensity of the light beam emitted therefrom is. It is difficult to accurately demodulate an electric signal into a control signal the same as that of the controller 22 based on the light beam at the low intensity emitted from the position away from the incidence path 18c. Increasing the emission intensity of the light emitting portion 17 or reducing the attenuation rate of the optical guide 18 can be a good way to solve such a problem, however, in either way substantial cost increases will be inevitable.

To the contrary, in the optical signal transfer device 101, the length of the optical guide 181 can be decreased since the light emitting area 211 of the transmitter system 121 is formed only on one of the three circumferentially divided areas of the opposing area 20. This can reduce the attenuation amount of the light beam traveling inside the optical guide 181. Moreover, in this device 101 the receiver system 111 uses only the three light receiving portions, which can contribute to a cost reduction.

(5) The optical guide 181 is configured to efficiently guide a light beam as an optical signal to the entire light emitting area 211 by use of total reflection.

(6) The optical guide 181 can be easily formed by bending a cylindrical acrylic member, which is very different from that 18 of the optical signal transfer device 10 (FIG. 5). The optical guide 18 is comprised of the ring-like main portion 18b and the incidence path 18c extending from a part thereof to a tangent line direction. Because of this, to form the optical guide 18, the main portion 18b is first formed by bending an acrylic member of a rectangular column shape and then joining it with the incidence path 18c. Alternatively, it can be formed by shape molding of an acrylic material, however, smoothing process to the surface is necessary to achieve total reflection. To the contrary, the optical guide 181 can be simply made by bending a cylindrical acrylic member made by drawing process, which can reduce the number of manufacture steps and manufacture costs.

(7) Having the scattering face 181e opposite to the exit face 181d, the optical guide can efficiently guide a light beam (optical signal) to the entire light emitting area 211 by total reflection, as well as reliably emit the light beam from the exit face 181*d*. Also, the scattering face 181*e* can be easily formed by rough process to the surface of the optical guide 181.

(8) Since the optical guide is made of a cylindrical acrylic member, the vertical cross section of the exit face 181*d* is semicircular. This can make a light beam from the exit face 181*d* be incident on the light receiving face 131*a* of each light receiving portion 131 efficiently. When emitted from the exit face 181*d*, the light beam is deflected by the exit face 181*d* or the interface of the optical guide 181 except one orthogonally passing through the interface. Among the light beam scattered by scattering face 181*e* to the exit face 181*d*, there is a light beam not directly traveling to the light receiving face 131*a* but deflected by the interface to travel to the light receiving face 131*a*. Thus, the exit face 181*d* with the semicircular vertical cross section can exert a lens effect. Accordingly, setting a distance between the exit face 181*d* and the light receiving face 131*a* of each light receiving portion 131 properly makes it possible to efficiently make the light beam from the exit face 181*d* be incident on the light receiving faces 131*a*. Due to such a lens effect, the scattering face 181*e* appears to be enlarged, seen from the light receiving face 131*a*. Therefore, the exit face 181*d* functions as a lens face which increases the amount of a light beam to be incident on each light receiving portion 131 (light receiving face 131*a*) of the receiver system 111.

(9) The light emitting portion 171 is configured to face the incidence face end 181*a* not directly but via the optical fiber 23. This can increase the degree of freedom of positioning the light emitting portion 171, the transceiver PCB 19 electrically connected with the light emitting portion 171 and the like. Also, this makes it easier to deal with electromagnetic waves emitted from the transceiver PCB 19, for example by accommodating the light emitting portion 171 and transceiver PCB 19 in a housing 24 which blocks emitted electromagnetic waves. A relatively large level of current is flowed into the transceiver PCB 19 instantaneously to drive the light emitting portion 171, which may generate electromagnetic waves.

(10) The groove 51*a* of the base unit 51 in which the optical guide is mounted is configured to have a reflective surface. This can help efficient usage of the light beam (optical signal) guided into the optical guide 181.

As described above, the optical signal transfer device 101 according to the second embodiment can optically transfer signals between the base unit 51 and the rotary optical unit 70 (rotary unit) in a non-contact manner without using a space around the rotary axis Ar.

The second embodiment describes an exemplary configuration where the receiver system 111 includes the three light receiving portions 131 with an equal interval on the same circumference (light receiving area 15) in a circumferential direction while the transmitter system 121 includes the light emitting area 211 on one-third of the opposing area 20 opposing the light receiving area 15. However, the present invention is not limited to such a configuration. It can be configured arbitrarily as long as the receiver system 111 can receive optical signals from the light emitting area 211 irrespective of the rotation of the rotary optical unit 70 relative to the base unit 51.

The optical signal transfer device according to the present invention comprises, in the receiver system, a natural number n (1 or more) of light receiving portions with an equal interval on the same circumference (light receiving area) in a circumferential direction, and, in the transmitter system, a light emitting area in a 1/n area of the opposing area facing the single light receiving area. Accordingly, the receiver system can receive optical signals from the light emitting area irrespective of the rotation of the rotary optical unit 70 relative to the base unit 51. The optical signal transfer device 10 in the first embodiment is an example where one (n=1) light receiving portion is provided while the optical signal transfer device 101 in the second embodiment is an example where three (n=3) light receiving portions are provided.

With a plurality of light receiving portions on the same circumference (single light receiving area), the receiver system can receive an optical signal from the light emitting area irrespective of rotation of the rotary optical unit 70 around the rotary axis Ar, as long as the optical guide of the transmitter system extends to form the light emitting area in a position opposing at least one of the light receiving portions in the opposing area to the light receiving area. The light receiving portions need not be always disposed with equal interval in the circumferential direction. Also, the transmitter system need not form the light emitting area in size of 1/n of the opposing area. It can form the light emitting area in size larger than 1/n of the opposing area.

However, it is the most efficient structure that the receiver system comprises n light receiving portions on the same circumference (single light receiving area) while the transmitter system forms the light emitting area in size of 1/n of the opposing area. The light emitting area formed in the 1/n area is not limited to one of precisely n-divided opposing areas. For example, a size (width) of each light receiving area in the circumferential direction can be added to the 1/n area.

According to the second embodiment, the optical guide 181 of the transmitter system 121 is made of an acrylic member with a circular vertical cross section. However, the optical guide 181 should not be limited to such a structure. It can be structured arbitrarily as long as it can guide a light beam (optical signal) from the light emitting portion in the extension direction to emit the light beam from the light emitting area. In the optical signal transfer device 10 including the optical guide 18 with a rectangular cross section, for example, a light beam scattered by the scattering face (181*e* in the second embodiment) and incident on both side faces at a smaller angle than the optimal angle is totally reflected thereby to the exit face 181*d*. Then, the light beam can be incident on the exit face (18*d*) at a larger angle than the optimal angle and emitted therefrom. This enables efficient use of the light beam in the optical guide. More efficient use of the light beam in the optical guide is possible when the exit face is configured to exert a lens effect as the exit face 181*d* of the second embodiment.

Third Embodiment

Figure 10:
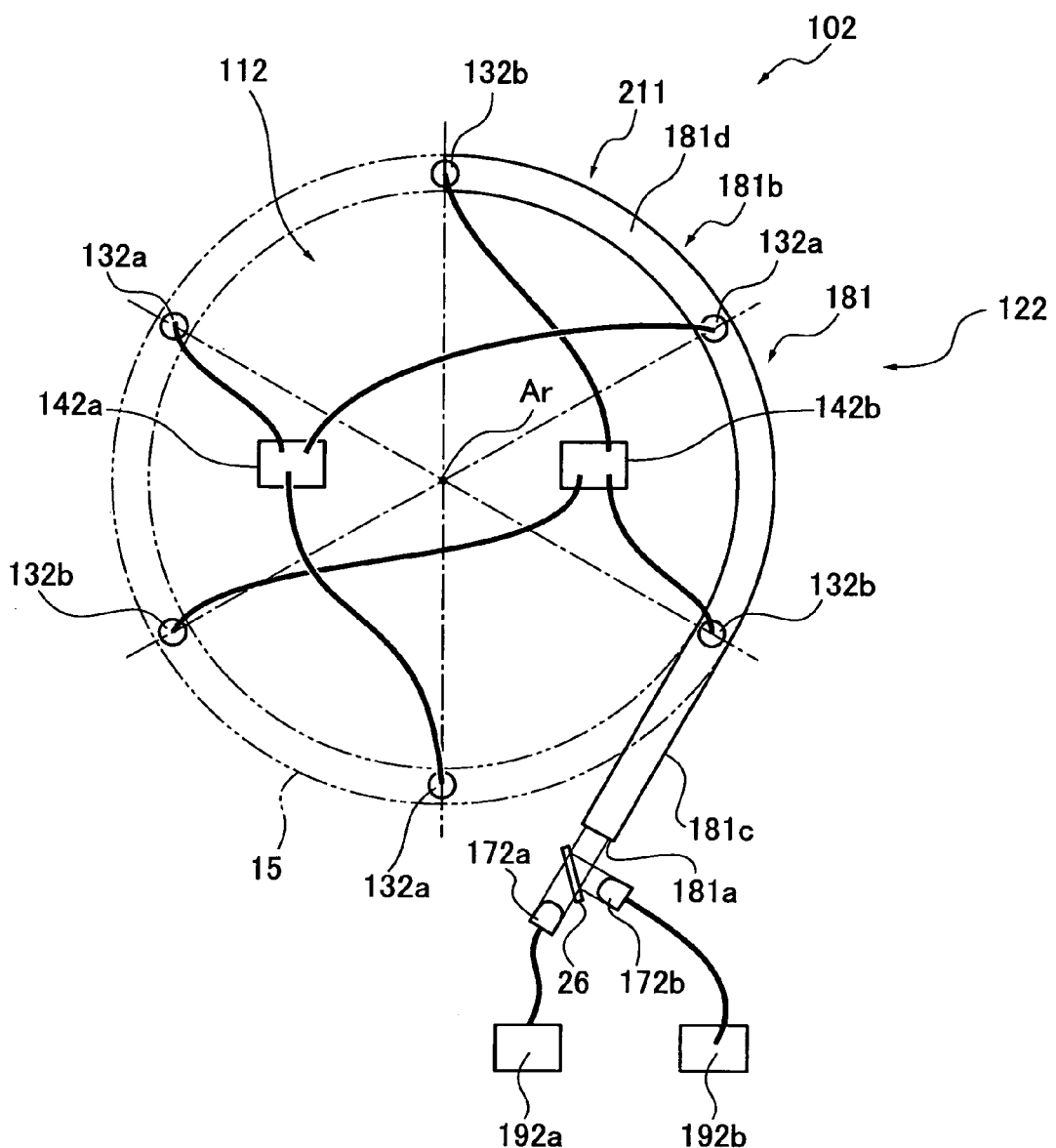
FIG. 10 illustrates an optical signal transfer device according to a third embodiment.

Next, an optical signal transfer device 102 according to the third embodiment will be described. The optical signal transfer device 102 is structured same as the optical signal transfer device 101 according to the second embodiment except that it can transmit a plurality of signals concurrently. The same function thereof will be given the same numeric codes of the second embodiment and a detailed description thereof will be omitted. FIG. 10 shows the structure of the optical signal transfer device 102.

The optical signal transfer device 102 is configured that a receiver system 112 can receive two kinds of light beams (optical signal) concurrently while a transmitter system 122 can emit two kinds of light beams concurrently.

Specifically, the receiver system 112 comprises three light receiving portions 132*a*, a receiver PCB 142*a* for the light receiving portions 132*a*, three light receiving portions 132*b*, and a receiver PCB 142*b* for the light receiving portions 132*b*. The three light receiving portions 132*a* are disposed on the same circumference (single light receiving area 15) with equal interval in the circumferential direction, and each of them is electrically connected with the receiver PCB 142*a*. The receiver PCB 142*a* is also electrically connected with the rotary unit controller 16 (FIG. 6) of the rotary optical unit 70 (not shown). Each light receiving portion 132*a* is configured to correspond to wavelengths of light beams emitted from a later-described light emitting portion 172*b* (to receive light in a specific wavelength range only, for example). Such a configuration is feasible easily by providing a not-shown filter on the light receiving face of each light receiving portion 132*a*.

Similarly, the three light receiving portions 132*b* are disposed on the same circumference (single light receiving area 15) with equal interval in the circumferential direction, and shifted in angle position from each other in the circumferential direction (by 60 degrees in the third embodiment) not to overlap the light receiving portions 132*a*. Each of them is electrically connected with the receiver PCB 142*b* which is also electrically connected with the rotary unit controller 16 (FIG. 6) of the rotary optical unit 70 (not shown). Each light receiving portion 132*b* is configured to correspond to wavelengths of light beams emitted from a later-described light emitting portion 172*b* (to receive light in a specific wavelength range only, for example). Such a configuration is feasible easily by providing a not-shown filter on the light receiving face of each light receiving portion 132*b*.

Upon receiving electric signals for their corresponding light receiving portions 132*a*, 132*b*, the receiver PCBs 142*a*, 142*b* demodulate them into control signals same as those of the controller 11 of the base unit 51 to output the demodulated signals to the rotary unit controller 16.

The transmitter system 122 uses light emitting portions 172*a*, 172*b* and a half mirror 26 as a light emitting portion in FIG. 10. The light emitting portion 172*a* can emit a light beam in a wavelength band corresponding to that of each light receiving portion 132*a*, and is connected with a transceiver PCB 192*a*. The light emitting portion 172*b* can emit a light beam in a wavelength band corresponding to that of each light receiving portion 132*b*, and is connected with a transceiver PCB 192*b*. The transceiver PCBs 192*a*, 192*b* are connected with the controller 22 of the base unit 51 to control emission of their corresponding light emitting portions 172*a*, 172*b* under control of the controller 22.

The light emitting portion 172*a* directly faces the incidence face end 181*a* of the optical guide 181 via the half mirror 26 while the light emitting portion 172*b* faces the half mirror 26 so that it is orthogonal to the optical axis of the light emitting portion 172*a*. Because of this, a light beam from the light emitting portion 172*a* and a light beam from the light emitting portion 172*b* are incident on the incidence face end 181*a* with their optical axes coincident with each other and guided into the optical guide 181.

This optical signal transfer device 102 can transfer two kinds of signals by receiving a light beam from the light emitting portion 172*a* at each light receiving portion 132*a* and processing it at the receiver PCB 142*a* and receiving a light beam from the light emitting portion 172*b* at each light receiving portion 132*b* and processing it at the receiver PCB 142*b*. Accordingly, the optical signal transfer device 102 can concurrently transfer two kinds of light beams (optical signals) in addition to realizing the effects of the optical signal transfer device 10. This makes it possible for the three dimensional position measuring apparatus 50 (FIG. 1) incorporating the device 102 to transfer a plurality of signals from the controller 22 of the base unit 51 to the rotary unit controller 16 of the rotary optical unit 70 (FIG. 6) at any time and quickly perform surveying work even during the rotation of the rotary optical unit 70 relative to the base unit 51.

Figure 11:
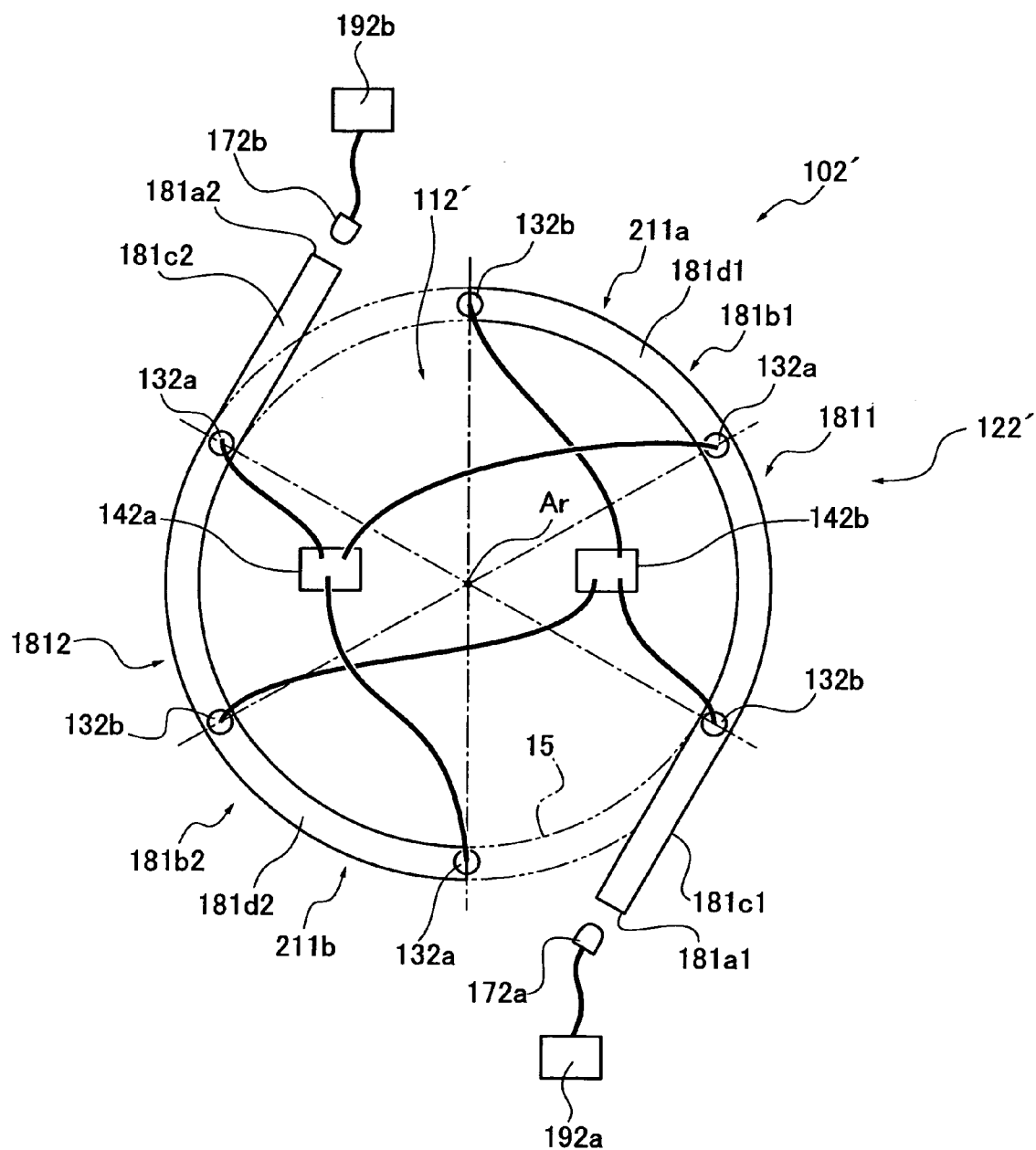
FIG. 11 illustrates another example of the optical signal transfer device according to the third embodiment.

The optical signal transfer device 102 according to the third embodiment is configured that the single optical guide 181 is used for the two light emitting portions 172*a*, 172*b* in the transmitter system 122. However, the present invention is not limited to such a configuration. As shown in an optical signal transfer device 102" of FIG. 11, for another example, a transmitter system 122' can include two optical guides 1811, 1812 for the two light emitting portions 172*a*, 172*b*. The two optical guides 1811, 1812 are configured the same as the optical guide 181 and disposed not to interfere with each other. The optical signal transfer device 102' needs to include the two optical guides but no half mirror, so that the degree of freedom in which the light emitting portions 172*a*, 172*b* are arranged can be increased.

Figure 12:
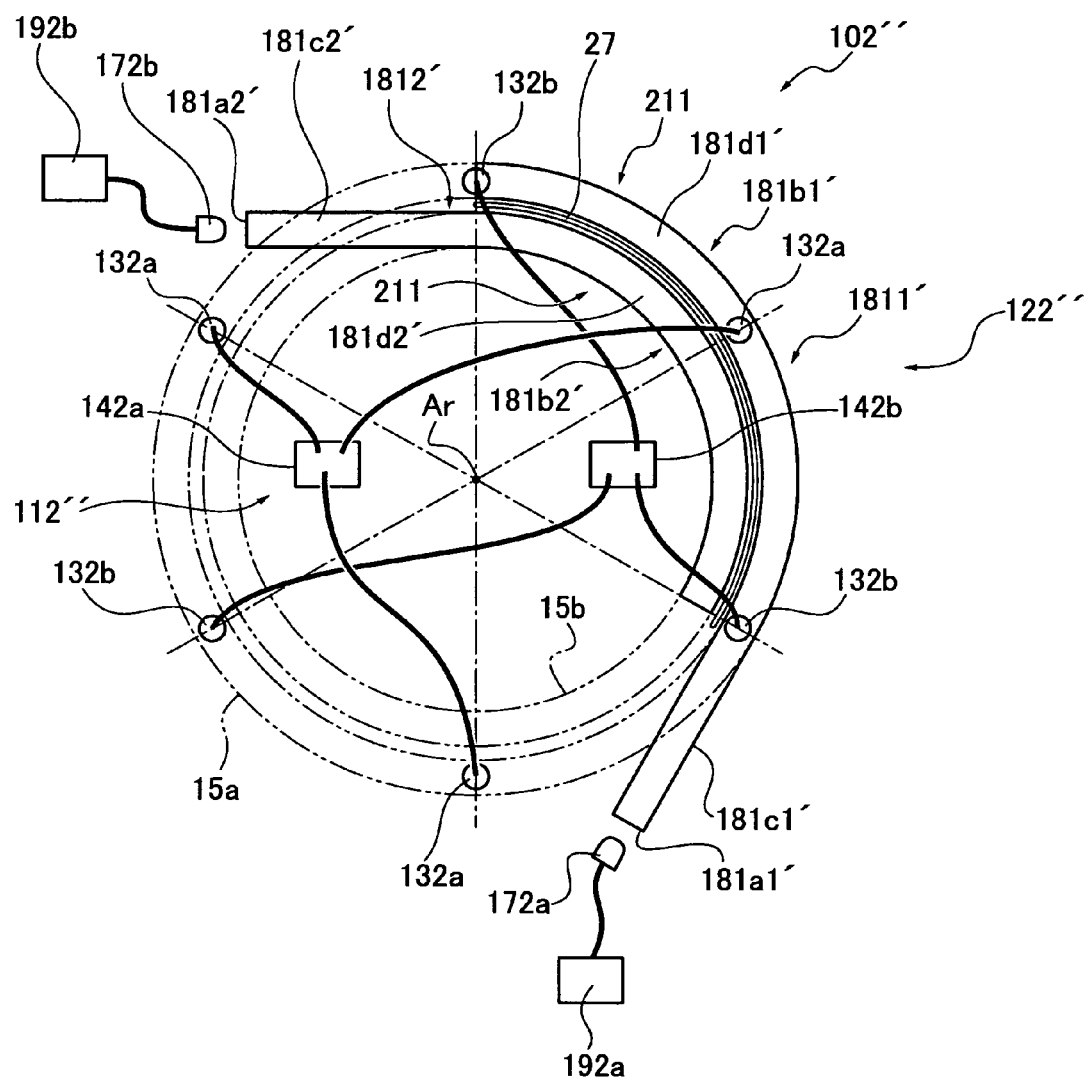
FIG. 12 illustrates another example of the optical signal transfer device.

Furthermore, the optical signal transfer device 102 according to the third embodiment is configured that the three light receiving portions 132*a* and the three light receiving portions 132*b* form the single light receiving area 15 in the receiver system 112. However, two light receiving areas 15*a*, 15*b* can be formed as shown in an optical signal transfer device 102" of FIG. 12 for another example. The optical signal transfer device 102" requires two optical guides 1811', 1812' which are formed to bend to be able to oppose their corresponding light receiving areas 15*a*, 15*b*. Preferably, the optical signal transfer device 102" is configured to include a shield member 27 between the optical guides 1811', 1812' which are parallel with each other, to optically shield both of the guides.

The above embodiments have described an example where the transmitter system 12 is provided in the base unit 51 while the receiver system 11 is provided in the rotary optical unit 70. However, they should not be limited to such an example. The arrangement can be reverse. In such a case, it is preferable to configure the rotary optical unit 70 that the center of gravity of the transmitter system is on the rotary axis Ar and weight distribution thereof in the circumferential direction of the rotary axis Ar is even.

Moreover, in the above embodiments, a receiver system can be changed to a transmitter system and vice versa by switching the positions of the light receiving portion 13 and the receiver PCB 14 and those of the light emitting portion 17 and the transceiver PCB 19, respectively, due to optical reversibility. For example, in the third embodiment, bi-directional signal transfer between the rotary optical unit 70 and the base unit 51 is feasible by switching the positions of either of the pairs of the light emitting portions 172*a*, 172*b* and transceiver PCBs 192*a*, 192*b* and those of either of the pairs of the light receiving portions 132*a*, 132*b* and the receiver PCBs 142*a*, 142*b*.

Furthermore, the above embodiments have described an example where the optical guide (18 and others) is a columnar member made of an acrylic material. However, it should not be limited to such an example. The optical guide can be formed arbitrarily as long as it can guide a light beam from the light emitting portion 17 of the transmitter system 12 and emit it from the light emitting area 21.

The above embodiments have described an example where the light receiving portion is an LED. However, it should not be limited to such an example. The light receiving portion can be formed arbitrarily such as a laser diode as long as light emission thereof is controllable for signal transfer.

The above embodiments have described an example where a distance is measured by detecting reflected light form the corner cube reflector. However, the present invention is applicable to a three dimensional position measuring apparatus without a corner cube reflector which directly detects reflected light from a target object to measure a distance.

Figure 13:
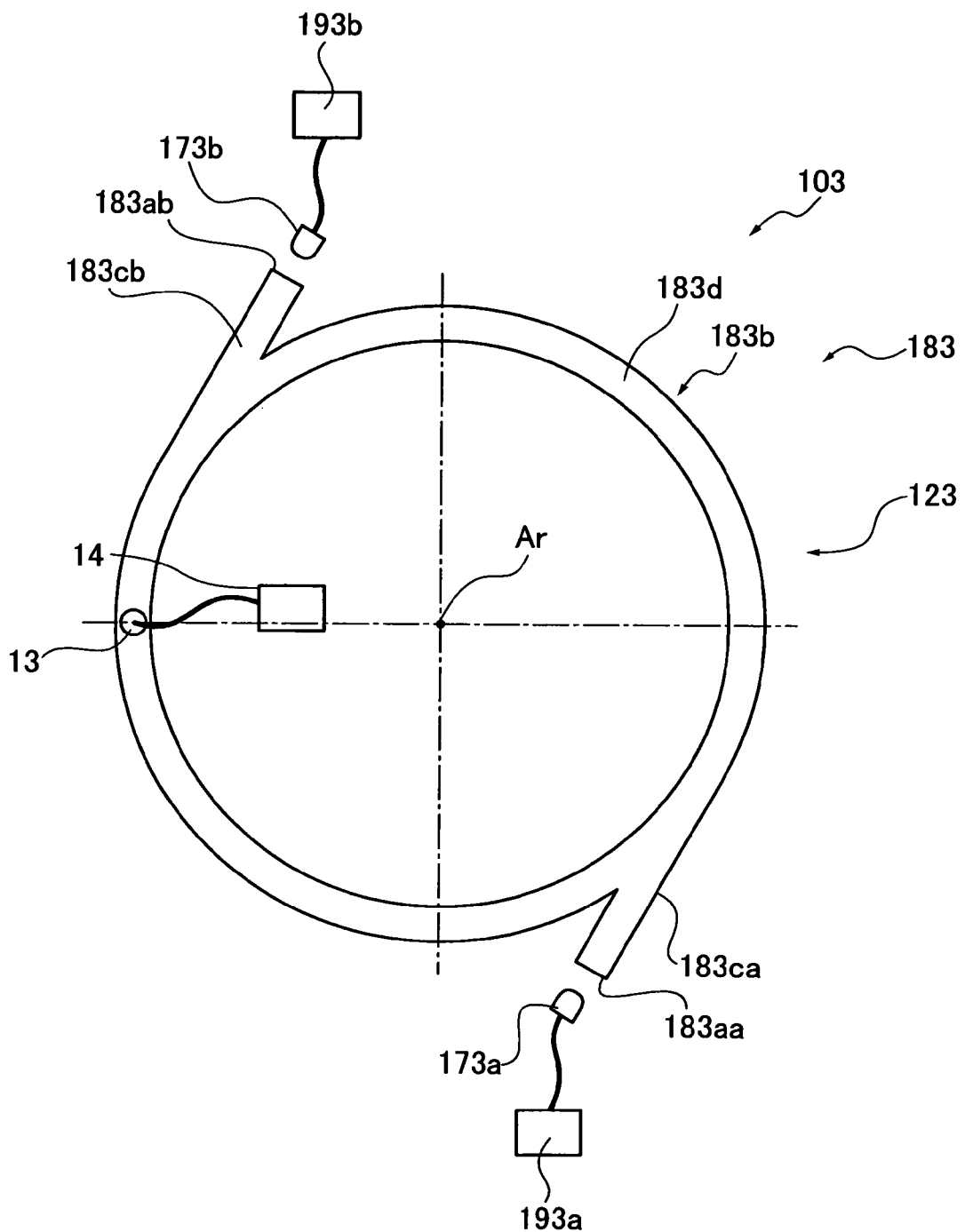
FIG. 13 illustrates another example of the optical signal transfer device.

The second and third embodiments can achieve an advantageous effect of improving signal transfer efficiency by forming the light emitting area 211 of the transmitter system 12 in only one of the n-circumferentially-divided opposing areas 20 (three in the second embodiment). For another example, an optical signal transfer device 103 shown in FIG. 13 can also attain the same effect to improve signal transfer efficiency.

The optical signal transfer device 103 is different from the optical signal transfer device 10 (FIG. 5) in including an optical guide 183 of a transmitter system 123. The optical guide 183 is configured to include two incidence paths 183ca, 183cb extending from a main portion 183b. The ends of the incidence paths 183ca, 183cb are formed to be plain faces orthogonal to the extension direction which are incidence end faces 183aa, 183ab. Also, the transmitter system 123 is provided with a light emitting portion 173a and a transceiver PCB 193a in association with the incidence end face 183aa, and with a light emitting portion 173b and a transceiver PCB 193b in association with the incidence end face 183ab. The light emitting portions 173a, 173b emit the same optical signal. The optical signal transfer device 103 can improve signal transfer efficiency without a light emitting portion with a high emission intensity (such as the light emitting portion 17 in FIG. 5).

As described above, the optical signal transfer device according to the present invention can transfer signals by emitting a light beam from the transmitter system and receiving it by the receiver system, without the transmitter system and the receiver system made in contact with each other.

Further, the optical signal transfer device according to the present invention is configured that the receiver system forms a ring-like light receiving area around the rotary axis while the transmitter system forms a light emitting area on an area opposing to the light receiving area, and the transmitter system and receiver system transfer signals by transmitting a light beam from the light emitting area and receiving it at the light receiving area. Therefore, it can transfer signals without using a space around the rotary axis.

The optical guide comprises an exit face opposing the light receiving area to emit a light beam and a scattering face to scatter a light beam to the exit face. Accordingly, a light emitting area with a simple configuration can be formed.

Furthermore, having the scattering face facing the exit face, the optical guide with a simple configuration can efficiently guide a light beam (optical signal) to the entire light emitting area and reliably emit the light beam from the exit face.

Moreover, the exit face is a lens face which increases the amount of a light beam to be incident on the light receiving portion of the receiver system among the light beam it emits. Therefore, the light beam emitted from the exit face can be efficiently received at the light receiving portion.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An optical signal transfer device which transfers a signal between a base unit and a rotary unit rotatable around a rotary axis and supported on the base unit, the device comprising:
a transmitter system provided in one of the base unit and the rotary unit to transmit a signal; and
a receiver system provided in the other of the base unit and the rotary unit to receive the signal from the transmitter system,
wherein the receiver system comprising n light receiving portions and a light reception controller, and n is a natural number,
wherein the light receiving portions are rotated around the rotary axis relative to the transmitter system by a relative rotation of the base unit and the rotary unit to form a single ring-like light receiving area,
wherein the light reception controller processes an electric signal output from each of the light receiving portions,
wherein the transmitter system comprises a plurality of light emitting portions, an emission controller which drives the light emitting portions in accordance with a transmit signal, and an optical guide having a plurality of light incident portions facing the light emitting portions, respectively, and the optical guide guides light from the light emitting portions to be emitted to the light receiving area,
wherein the transmitter system includes an opposing area in a ring-like form disposed around the rotary axis, and the opposing area opposes the light receiving area and is equally divided into n areas in a circumferential direction,
wherein the optical guide guides the light to at least one of the n divided areas as a light emitting area, and
wherein the receiver system and the transmitter system are configured such that at least one of the n light receiving portions faces one of the light emitting areas irrespective of a rotary position of each of the light receiving portions relative to the transmitter system.

2. The optical signal transfer device of claim 1, wherein the optical guide includes an exit face which opposes the light receiving area and emits the light, and includes inside a scattering face which scatters the light in a direction to the exit face.

3. The optical signal transfer device of claim 2, wherein the scattering face is arranged opposing the exit face.

4. The optical signal transfer device of claim 3, wherein the exit face is a lens face which increases an amount of a light beam which is incident on the light receiving portions of the receiver system.

5. The optical signal transfer device of claim 1, further comprising:
a main lens system which includes a plurality of lenses and mirrors; and
a rotary reflective mirror disposed on an opposite side of the transmitter system from the main lens system,
wherein the main lens system transmits measuring light and tracking light to the rotary reflective mirror through the ring-like light receiving area and the ring-like form of the opposing area in a direction parallel to the rotary axis.

6. The optical signal transfer device of claim 1, wherein the light receiving portions are disposed on a single plane orthogonal to the rotary axis.

7. The optical signal transfer device of claim 6, wherein the optical guide includes an exit face which opposes the light receiving area and emits the light, and includes inside a scattering face which scatters the light in a direction to the exit face.

8. The optical signal transfer device of claim 7, wherein the scattering face is arranged opposing the exit face.

9. The optical signal transfer device of claim 8, wherein the exit face is a lens face which increases an amount of a light beam which is incident on the light receiving portions of the receiver system.

10. The optical signal transfer device of claim 6, further comprising:
   a main lens system which includes a plurality of lenses and mirrors; and
   a rotary reflective mirror disposed on an opposite side of the transmitter system from the main lens system,
   wherein the main lens system transmits measuring light and tracking light to the rotary reflective mirror through the ring-like light receiving area and the ring-like form of the opposing area in a direction parallel to the rotary axis.

* * * * *